(12) United States Patent
Kannari et al.

(10) Patent No.: US 9,009,080 B2
(45) Date of Patent: Apr. 14, 2015

(54) CONTENT PROTECTION SYSTEM

(75) Inventors: Shingo Kannari, Tokyo (JP); Tsunehisa Kazawa, Tokyo (JP); Kazuhiro Kanee, Chiba (JP)

(73) Assignees: Sony Corporation, Tokyo (JP); Sony Corporation Entertainment Inc., Tokyo (JP)

( * ) Notice: Subject to any disclaimer, the term of this patent is extended or adjusted under 35 U.S.C. 154(b) by 47 days.

(21) Appl. No.: 13/099,679

(22) Filed: May 3, 2011

(65) Prior Publication Data
US 2011/0302662 A1 Dec. 8, 2011

(30) Foreign Application Priority Data

Jun. 8, 2010 (JP) .................................. 2010-130990
Nov. 30, 2010 (JP) .................................. 2010-266999

(51) Int. Cl.
*G06F 21/00* (2013.01)
*G06F 21/10* (2013.01)

(52) U.S. Cl.
CPC ...................................... *G06F 21/10* (2013.01)

(58) Field of Classification Search
CPC ................................................ G06Q 2220/18
USPC ........................................................... 705/59
See application file for complete search history.

(56) References Cited

U.S. PATENT DOCUMENTS

| | | | |
|---|---|---|---|
| 7,483,958 B1 * | 1/2009 | Elabbady et al. ............. | 709/217 |
| 2002/0013772 A1 | 1/2002 | Peinado | |
| 2003/0056121 A1 | 3/2003 | Kimoto et al. | |
| 2004/0073789 A1 * | 4/2004 | Powers .......................... | 713/165 |
| 2004/0233897 A1 | 11/2004 | Yamaguchi et al. | |
| 2005/0033967 A1 * | 2/2005 | Morino et al. ................. | 713/182 |
| 2008/0244751 A1 * | 10/2008 | Peinado .......................... | 726/26 |
| 2008/0295182 A1 * | 11/2008 | Ogai ............................... | 726/29 |
| 2010/0280953 A1 * | 11/2010 | Kitazato .......................... | 705/59 |

FOREIGN PATENT DOCUMENTS

| | | |
|---|---|---|
| CN | 1801928 | 7/2006 |
| JP | 2003-101526 | 4/2003 |

(Continued)

OTHER PUBLICATIONS

Chinese First Office Action dated Aug. 27, 2013, from corresponding Chinese Application No. 201110151660.6.

(Continued)

*Primary Examiner* — Charles C Agwumezie
(74) *Attorney, Agent, or Firm* — Katten Muchin Rosenman LLP

(57) ABSTRACT

Provided is a content protection system, in which: a user terminal judges, when a content is to be reproduced or executed, whether or not the user terminal has a usage right of the content, and makes, if it is judged that the user terminal does not have the usage right of the content, a request to a license management apparatus to acquire the usage right of the content; the license management apparatus generates, when the request to acquire the usage right is received from the user terminal, license information containing information on an expiration date that is set based on a timing when the request is received, and transmits the generated license information to the user terminal; and the user terminal judges that the user terminal has the usage right of the content until the expiration date indicated by the license information received from the license management apparatus arrives.

8 Claims, 5 Drawing Sheets

(56) References Cited

FOREIGN PATENT DOCUMENTS

| | | |
|---|---|---|
| JP | 2006-40038 | 2/2006 |
| JP | 2007-13731 | 1/2007 |
| WO | 2008-155901 | 12/2008 |

OTHER PUBLICATIONS

European Search Report dated Feb. 15, 2013, from corresponding European Application No. 11004520.0.

Japanese Notification of Reason for Refusal dated Jul. 22, 2014 for corresponding Application No. 2010-266999.

* cited by examiner

FIG.5

| USER IDENTIFICATION INFORMATION | CONTENT IDENTIFICATION INFORMATION | EFFECTIVE PERIOD | | PERMISSION PERIOD |
|---|---|---|---|---|
| | | START TIMING | END TIMING | |
| USER U1 | CONTENT C1 | y1/m1/d1 h1:m1:s1 | y2/m2/d2 h2:m2:s2 | 3h |
| ... | ... | ... | ... | ... |

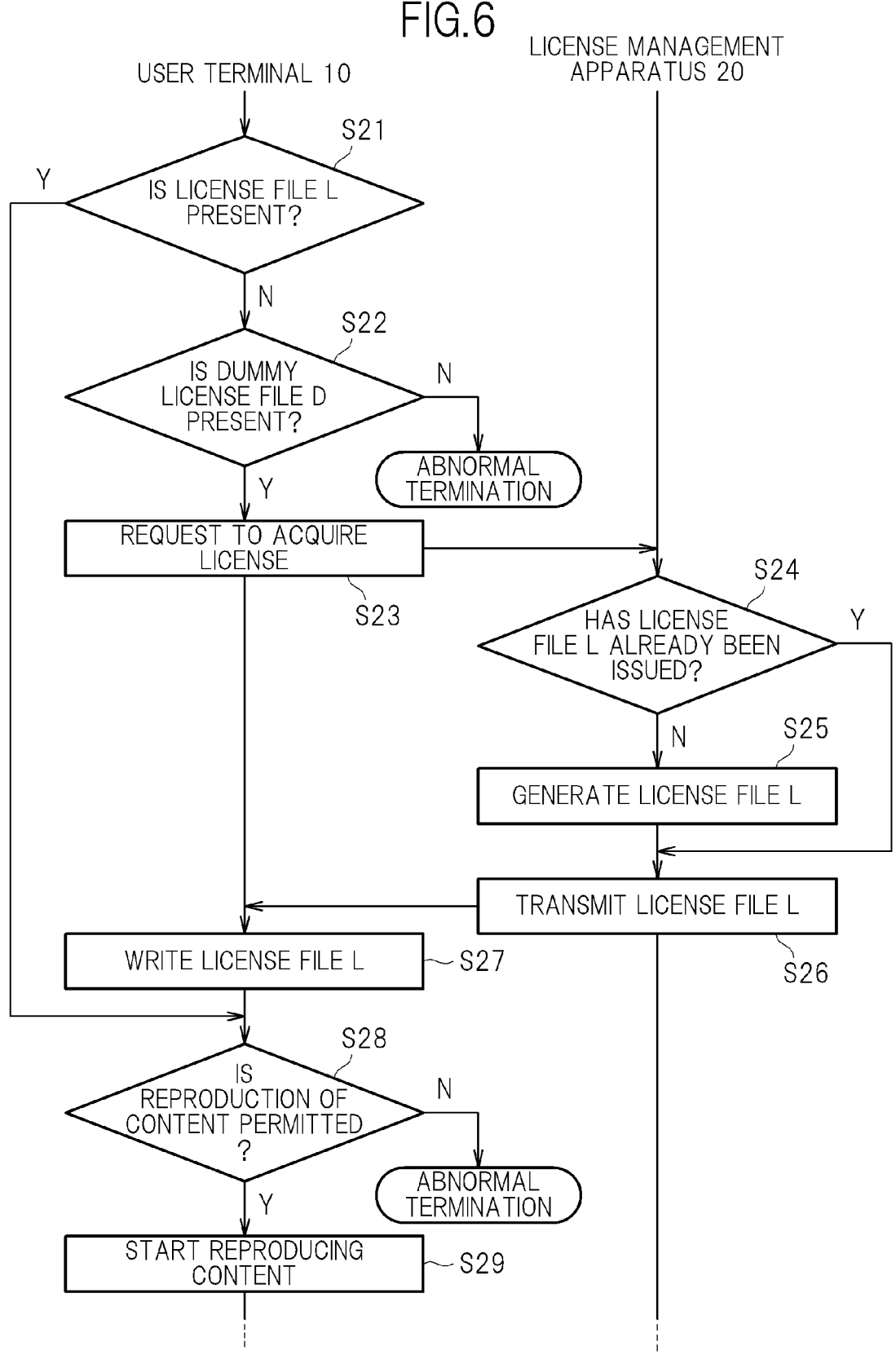

CONTENT PROTECTION SYSTEM

BACKGROUND OF THE INVENTION

1. Field of the Invention

The present invention relates to a content protection system for controlling whether or not to permit use of a content by a user, a user terminal constituting the content protection system, a content protection method, and an information storage medium.

2. Description of the Related Art

In recent years, for the purpose of copyright protection and so on, there has been proposed a content protection technology for permitting use of a content such as a game, a video, or a song by a user only under certain conditions. By using such content protection technology, use of a content by a user can be limited so that, for example, the user is permitted to reproduce the content only in a certain time period.

SUMMARY OF THE INVENTION

An object of the present invention is to provide a content protection system capable of controlling whether or not to permit use of a content by a user by a method different from conventional methods, a user terminal constituting the content protection system, a content protection method, and an information storage medium.

According to the present invention, there is provided a content protection system, including: a user terminal; and a license management apparatus, the user terminal including: judging means for judging, when a content is to be reproduced or executed, whether or not the user terminal has a usage right of the content; and usage right requesting means for making, if the judging means judges that the user terminal does not have the usage right of the content, a request to the license management apparatus to acquire the usage right of the content, the license management apparatus including: license information generating means for generating, when the request to acquire the usage right is received from the user terminal, license information containing information on an expiration date that is set based on a timing when the request is received; and license information transmitting means for transmitting the generated license information to the user terminal, in which the judging means judges that the user terminal has the usage right of the content until the expiration date indicated by the license information received from the license management apparatus arrives.

In the content protection system described above, the license information generating means may generate the license information containing information on the expiration date that is set based on a timing when a predetermined permission period has passed from the timing when the request is received.

Also, in the content protection system described above: the user terminal may further include means for generating, when the content is to be acquired, temporary license information on the content; and the usage right requesting means may make, when the temporary license information is present, the request to the license management apparatus to acquire the usage right of the content.

Further, in the content protection system described above: the temporary license information may contain information on a temporary expiration date; and the user terminal may further include means for displaying, as information on the usage right of the content, the temporary expiration date before acquiring the license information, and the expiration date indicated by the license information after acquiring the license information.

Further, in the content protection system described above: the usage right requesting means may transmit, when making the request to the license management apparatus to acquire the usage right of the content, user identification information for identifying a user who has provided an instruction to reproduce or execute the content to the license management apparatus; the license information generating means may judge whether or not the license information for granting the usage right of the content to the user identified by the user identification information has been generated, and when the license information has not been generated, newly generate the license information to the user; and the license information transmitting means may transmit, when it is judged that the license information has been generated for the user identified by the user identification information, the generated license information to the user terminal.

According to the present invention, there is also provided a user terminal to be connected to a license management apparatus, including: judging means for judging, when a content is to be reproduced or executed, whether or not the user terminal has a usage right of the content; and usage right requesting means for making, if the judging means judges that the user terminal does not have the usage right of the content, a request to the license management apparatus to acquire the usage right of the content, in which the judging means judges that the user terminal has the usage right of the content until an expiration date indicated by license information received from the license management apparatus in response to the request to acquire the usage right arrives, the expiration date being set based on a timing when the license management apparatus receives the request to acquire the usage right.

According to the present invention, there is also provided a content protection method using a user terminal connected to a license management apparatus, including: a judging step of judging, by the user terminal, when a content is to be reproduced or executed, whether or not the user terminal has a usage right of the content; and a usage right requesting step of making, by the user terminal, if it is judged in the judging step that the user terminal does not have the usage right of the content, a request to the license management apparatus to acquire the usage right of the content, in which, in the judging step, if license information is received from the license management apparatus in response to the request to acquire the usage right, it is judged that the user terminal has the usage right of the content until an expiration date indicated by the license information arrives, the expiration date being set based on a timing when the license management apparatus receives the request to acquire the usage right.

Further, according to the present invention, there is also provided a computer-readable information storage medium having a program stored therein, the program causing a computer connected to a license management apparatus to function as: judging means for judging, when a content is to be reproduced or executed, whether or not the computer has a usage right of the content; and usage right requesting means for making, if the judging means judges that the computer does not have the usage right of the content, a request to the license management apparatus to acquire the usage right of the content, in which the judging means judges that the computer has the usage right of the content until an expiration date indicated by license information received from the license management apparatus in response to the request to acquire the usage right arrives, the expiration date being set based on a timing when the license management apparatus receives the request to acquire the usage right.

BRIEF DESCRIPTION OF THE DRAWINGS

In the accompanying drawings:

FIG. 5 is a diagram illustrating an example of information on permission conditions stored in a license management apparatus; and FIG. 6 is a flow chart illustrating an example of a flow of processing executed by the content protection system according to the embodiment of the present invention at the time of starting use of the content.

DETAILED DESCRIPTION OF THE INVENTION

Hereinafter, an embodiment of the present invention is described in detail with reference to the drawings.

Figure 1:
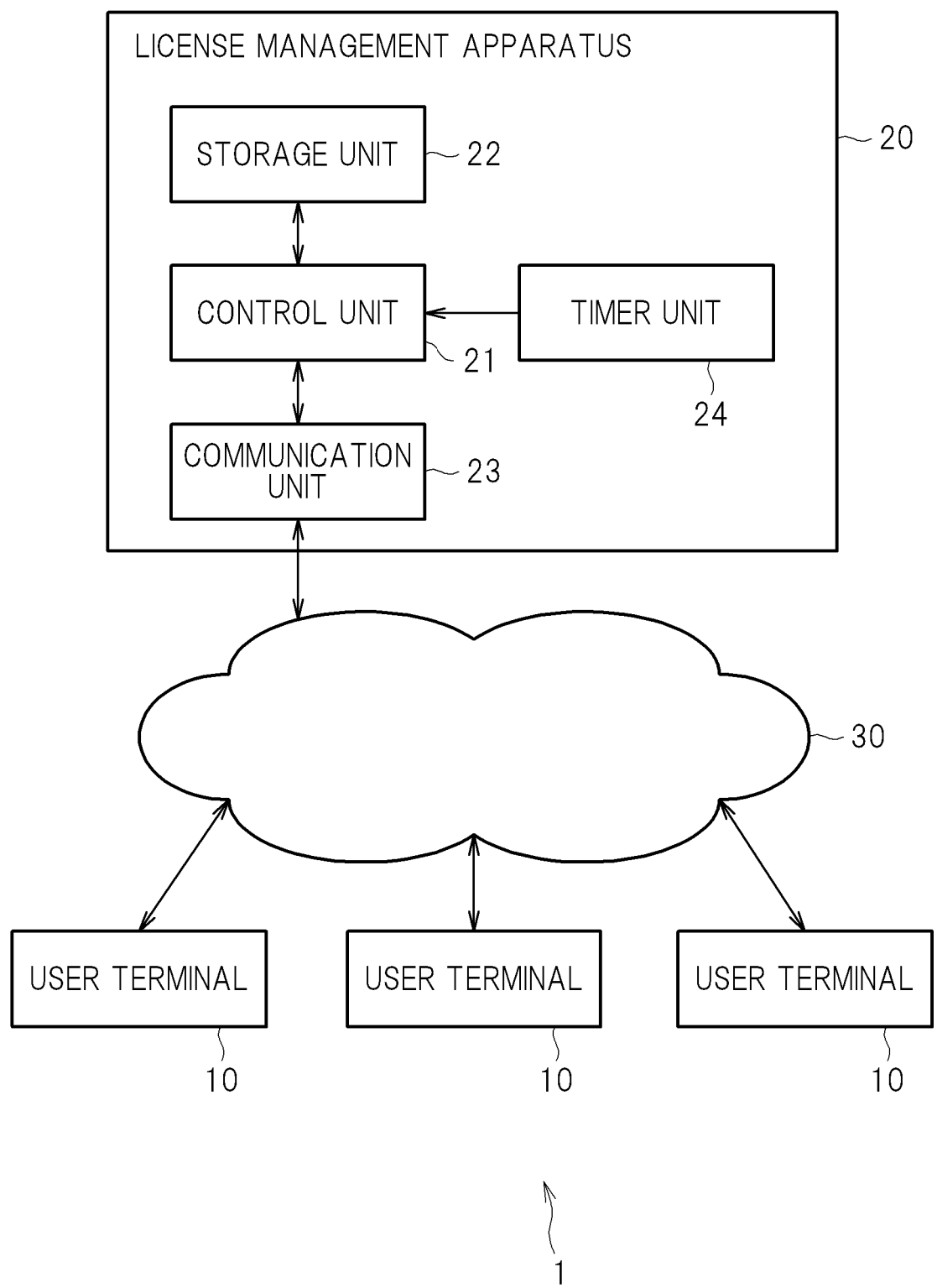
FIG. 1 is a schematic diagram of a content protection system according to an embodiment of the present invention.

FIG. 1 is a schematic diagram illustrating an overview of a content protection system 1 according to the embodiment of the present invention. The content protection system 1 includes a plurality of user terminals 10 and a license management apparatus 20. Each of the user terminals 10 is communicably connected to the license management apparatus 20 through a communication network 30. The communication network 30 may include a variety of networks such as the Internet, a local area network, and a wireless communication network.

The user terminal 10 is an information processing apparatus used by a user to use a content such as a game, and may include a video game console, a portable game machine, a personal computer, and the like. Note that, in this embodiment, the content to be processed (reproduced or executed) by the user terminal 10 may include a variety of contents such as a game content, a moving image, a still image, audio data, and an electronic book. The user can watch or listen to details of the content (in other words, use the content) by the user terminal 10 executing the content of a program type, such as a game content, or reproducing the content of a data type, such as a moving image, a still image, audio data, an electronic book, or the like. Note that, hereinafter, for convenience of description, processing executed by the user terminal 10 on the content for the user to use the content is referred to as reproduction of the content, but the "reproduction of the content" may include processing of executing a program in the case of the content of the program type.

Figure 2:
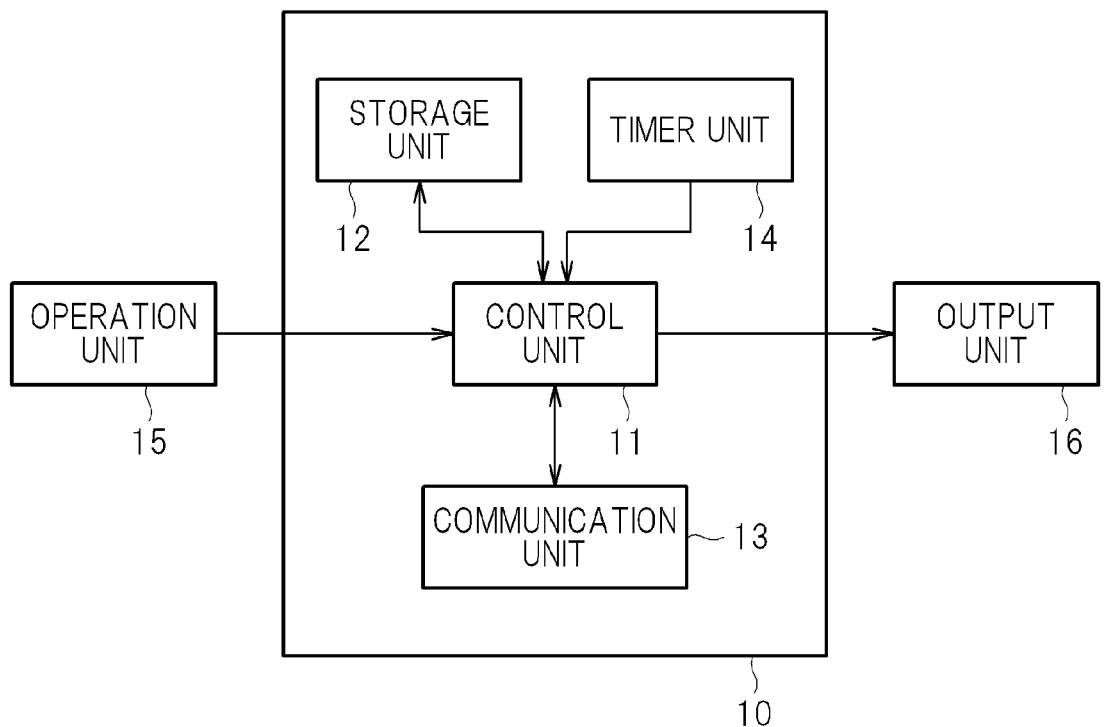
FIG. 2 is a configuration diagram of a user terminal according to the embodiment of the present invention.

FIG. 2 is a configuration block diagram illustrating a configuration of the user terminal 10. As illustrated in FIG. 2, the user terminal 10 includes a control unit 11, a storage unit 12, a communication unit 13, and a timer unit 14. Further, the user terminal 10 is connected to an operation unit 15 and an output unit 16.

The control unit 11 is a program control device such as a central processing unit (CPU) and executes various types of information processing in accordance with programs stored in the storage unit 12. The storage unit 12 includes a memory element such as a random access memory (RAM) or a read-only memory (ROM), and stores the programs executed by the control unit 11 and data to be processed by the programs. In particular, in this embodiment, the storage unit 12 stores data of the content to be reproduced by the user terminal 10. The storage unit 12 also functions as a work memory for the control unit 11.

The communication unit 13 is an interface for communicating data with another apparatus via the communication network 30, and the user terminal 10 transmits and receives information to and from the license management apparatus 20 via the communication unit 13. Further, the timer unit 14 includes a real-time clock or the like and counts the current date and time. The control unit 11 may acquire information on the current date and time by referring to time information counted by the timer unit 14.

The operation unit 15 is a device for receiving operational input from the user and may include a keyboard, a mouse, or a controller for a video game console, for example. Further, the operation unit 15 may include an operation member provided on a surface of a casing of the user terminal 10, such as an operation button or a switch. The user makes an operation on the operation unit 15 to select a content to be watched or listened to or provide an instruction to start or stop watching or listening to the content with respect to the user terminal 10.

The output unit 16 is a device for outputting details of a content to be reproduced by the user terminal 10. Specifically, if the content is a moving image, a still image, or an electronic book, the output unit 16 may be a display device for displaying the details of the content. If the content is audio data, the output unit 16 may be an audio output device such as headphones or a loudspeaker. Further, the output unit 16 may include both the display device and the audio output device. Note that, as with the operation unit 15, the output unit 16 may also be formed integrally with the casing of the user terminal 10. The output unit 16 displays the details of the content as an image or reproduces the details of the content as sound, to thereby allow the user to watch or listen to the details of the content reproduced by the user terminal 10.

The license management apparatus 20 is an information processing apparatus such as a server computer and, in response to a request from each user terminal 10, transmits license information required for the user terminal 10 to reproduce a content. Further, in this embodiment, the license management apparatus 20 holds the content itself to be reproduced by each user terminal 10 and also distributes the content in response to a request from the user terminal 10.

As illustrated in FIG. 1, the license management apparatus 20 includes a control unit 21, a storage unit 22, a communication unit 23, and a timer unit 24.

The control unit 21 is a program control device such as a CPU and executes various types of information processing in accordance with programs stored in the storage unit 22. The storage unit 22 includes a memory element such as a RAM or a ROM and a disk device such as a hard disk, and stores the programs executed by the control unit 21 and data to be processed by the programs. The storage unit 22 also functions as a work memory for the control unit 21.

The communication unit 23 is an interface for communicating data with another apparatus via the communication network 30, and the license management apparatus 20 transmits and receives information to and from each user terminal 10 via the communication unit 23. Further, the timer unit 24 includes a real-time clock or the like and counts the current date and time. The control unit 21 may acquire information on the current date and time by referring to time information counted by the timer unit 24.

Next, an outline of content protection by the content protection system 1 according to this embodiment is described. In this embodiment, the user terminal 10 acquires a content distributed by the license management apparatus 20 and reproduces the acquired content. The content distributed by the license management apparatus 20 in this embodiment is protected, for example, by being encrypted such that the content can be reproduced only when conditions (permission conditions) designated by the distributor of the content are satisfied. Therefore, in order to reproduce the protected content, the user terminal 10 needs to acquire, from the license management apparatus 20, license information (hereinafter, referred to as license file L) indicating that the user terminal 10 has a usage right of the content. The license file L includes information on the permission conditions described above, and the user terminal 10 judges whether or not reproduction of the content is permitted based on the permission conditions. Specifically, when the user provides an instruction to reproduce a content, the user terminal 10 reproduces the content only in a case where it is judged that a license file L corresponding to the content has been acquired and permission conditions indicated by the license file L are satisfied. In this way, the distributor distributing the content through the license management apparatus 20 may control the user to watch or listen to the content under restrictions intended by the distributor.

Specifically, in this embodiment, the license management apparatus 20 may provide a content to the user terminal 10 under the following two forms of restrictions. The first form is a form in which the subject user is permitted to freely watch or listen to the content. Hereinafter, the content for which the first form of restriction is set is referred to as a provision-type content. Note that, for the provision-type content, an expiration date until which the content is allowed to be watched or listened to (hereinafter, referred to as expiration date XD) maybe set. In a case where the expiration date XD is set, the user is allowed to watch or listen to the content until the expiration date XD arrives, but when the expiration date XD arrives, the user is not allowed to watch or listen to the content any more. The expiration date XD in this case is predetermined at the time of distributing the content.

The second form is, on the other hand, a form in which the subject user is permitted to use the content for a limited time period. Hereinafter, the content for which the second form of restriction is set is referred to as a rental-type content. The rental-type content has a restriction in time period during which the user is allowed to use the content, for example, three hours or one day (hereinafter, referred to as permission period PH). If the permission period PH starts at the timing of distribution of the content, the user may not be able to watch or listen to the content for the permission period PH unless he or she starts watching or listening to the content immediately after the content is distributed, which is inconvenient. Further, in a case where the content has a large data size and takes time to download, if the permission period PH starts before the start of distribution of the content, the time period during which the content is allowed to be watched or listened to is reduced by the time period needed for download. Therefore, in this embodiment, the permission period PH is controlled to be counted not from the time when the content is distributed but from the time point at which the user terminal 10 first starts reproducing the content. This allows the user to start watching or listening to the content at a convenient time after the content is downloaded, and to watch or listen to the content from the time point until the permission period PH set by the distributor of the content has passed.

Note that, also for the rental-type content, in addition to the restriction of the permission period PH described above, the expiration date similar to the case of the provision-type content maybe set at the time of distribution of the content. Hereinafter, the expiration date set for the rental-type content at the time of distribution of the content is referred to as a temporary expiration date TXD. In the case of the rental-type content, the expiration date XD until which the user is actually allowed to watch or listen to the content is not determined at the time of distribution of the content, but is finally determined at the time point at which the user terminal 10 first attempts to start reproducing the content. Specifically, the expiration date XD for a rental-type content to which the temporary expiration date TXD is set is determined as the earlier one of the timing when the permission period PH has passed from the time point at which the user attempts to start watching or listening to the content, and the timing indicated by the temporary expiration date TXD. Note that, in the above-mentioned example, the earlier one of the two timings is determined as the expiration date XD. Alternatively, the expiration date XD may be determined to the later one of the timing when the permission period PH has passed from the time point at which the user attempts to start watching or listening to the content, and the timing indicated by the temporary expiration date TXD. Further, in a case of a content for which the temporary expiration date TXD is not set, the expiration date XD is determined to be the timing when the permission period PH has passed from the time point at which the user attempts to start watching or listening to the content. Similarly to the case of the provision-type content, the user is allowed to watch or listen to the content until the thus-determined expiration date XD arrives.

Figure 3:
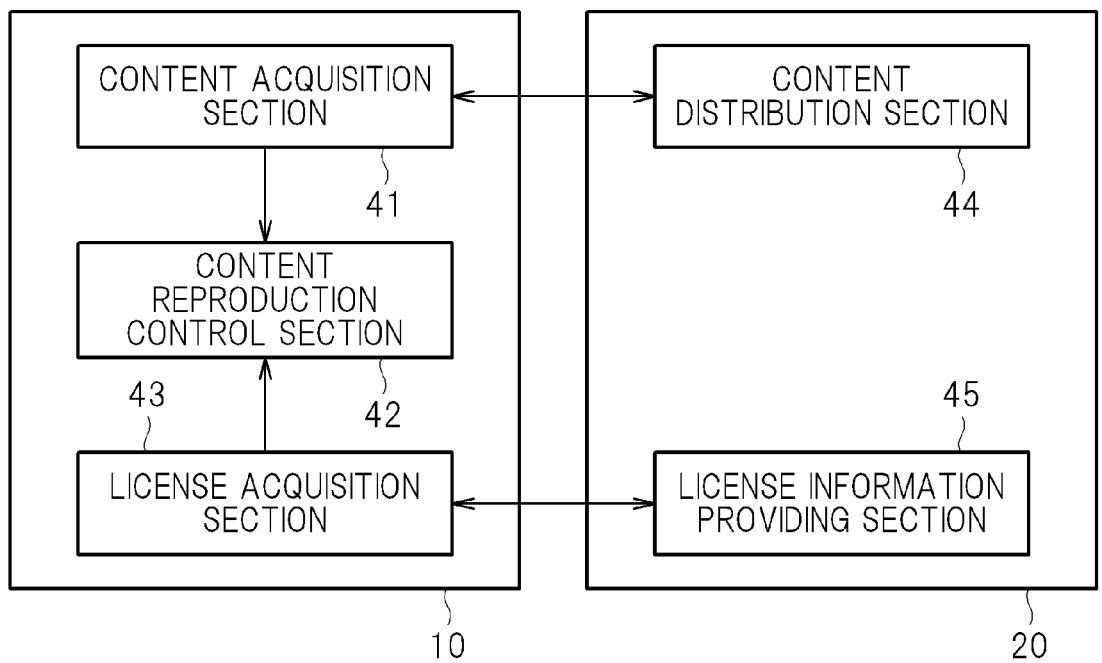
FIG. 3 is a functional block diagram illustrating functions of the content protection system according to the embodiment of the present invention.

Hereinafter, functions realized by the content protection system 1 according to this embodiment are described. FIG. 3 is a functional block diagram illustrating the functions realized by the content protection system 1. As illustrated in FIG. 3, the user terminal 10 functionally includes a content acquisition section 41, a content reproduction control section 42, and a license acquisition section 43. Those functions are realized by the control unit 11 executing the programs stored in the storage unit 12. Further, the license management apparatus 20 functionally includes a content distribution section 44 and a license information providing section 45. Those functions are realized by the control unit 21 executing the programs stored in the storage unit 22. Note that, the programs executed by each of the control unit 11 and the control unit 21 may be provided by being stored in various types of computer-readable information storage mediums, for example, an optical disc and the like, or may be provided through a communication network such as the Internet.

The content acquisition section 41 of the user terminal 10 transmits a request to acquire a content to the license management apparatus 20 based on an instruction from the user or the like. Then, the content acquisition section 41 receives data of the content distributed by the license management apparatus 20 in response to the request to acquire the content and stores the acquired content in the storage unit 12.

In this embodiment, in the case of the provision-type content, the license file L is transmitted from the license management apparatus 20 to the user terminal 10 along with the distribution of the content. In the case where the expiration date XD for watching or listening to the content is set, the license file L contains information indicating the expiration date XD. In the case of the rental-type content, on the other hand, the license file L is not provided to the user terminal 10 at the time of distribution of the content. Instead, when the user terminal 10 acquires the content from the license management apparatus 20, the user terminal 10 generates temporary license information (hereinafter, referred to as dummy license file D) in association with the content. The process of generating the dummy license file D is described later in detail.

When the content reproduction control section 42 of the user terminal 10 executes reproduction of the content, the content reproduction control section 42 uses the license file L corresponding to the content to judge whether or not the user terminal 10 has the usage right of the content. Specifically, in a case attempting to start reproduction of the content by, for example, receiving an instruction to reproduce the content from the user, the content reproduction control section 42 first judges whether or not the license file L storing information indicating the usage right of the content is present. If the license file L is present, the content reproduction control section 42 further refers to information on the permission conditions stored in the license file L to judge whether or not to permit the user who has provided the instruction to reproduce the content to reproduce the content. Particularly in this embodiment, the license file L may store, as one of the permission conditions, information indicating the expiration date XD until which the reproduction of the content is permitted. In this case, the content reproduction control section 42 compares the information on the expiration date XD with the current date and time counted by the timer unit 14, to judge whether or not the expiration date XD has arrived. If the expiration date XD has arrived (in other words, the current date and time is at or after the expiration date XD), it is judged that the reproduction of the content is not permitted. On the other hand, if the expiration date XD has not arrived and the other permission conditions contained in the license file L are also satisfied, it is judged that the reproduction of the content is permitted, and the reproduction process of the content is started.

Further, if the corresponding license file L does not exist in the first place, the reproduction of the content is not generally permitted. However, in this embodiment, if the dummy license file D corresponding to the content is present instead of the license file L, the content reproduction control section 42 instructs the license acquisition section 43 to acquire the license file L. When the license acquisition section 43 successfully acquires the license file L in response to the instruction, the content reproduction control section 42 judges whether or not the reproduction of the content is permitted based on the permission conditions stored in the newly acquired license file L.

If the content reproduction control section 42 judges that the user does not have the usage right of the content he or she has provided the instruction for reproduction, the license acquisition section 43 of the user terminal 10 requests the license management apparatus 20 to acquire the usage right of the content. More specifically, if the dummy license file D is present for the content to be reproduced by the content reproduction control section 42, the license acquisition section 43 transmits a request to acquire the license file L for the content to the license management apparatus 20 in accordance with the instruction of the content reproduction control section 42. Then, the license acquisition section 43 stores the license file L provided by the license information providing section 45 of the license management apparatus 20 in response to the acquisition request in the storage unit 12. Accordingly, the content reproduction control section 42 can reproduce the content based on the newly acquired license file L.

As described above, when the request to acquire the content is received from the content acquisition section 41 of the user terminal 10, the content distribution section 44 of the license management apparatus 20 distributes the content to the user.

In response to the request from the user terminal 10, the license information providing section 45 of the license management apparatus 20 transmits the license file L for granting the usage right of the requested content to the user terminal 10. At this time, for example, the license information providing section 45 may execute billing processing or the like before transmitting the license file L to the user terminal 10.

Note that, in a case where the target content is a provision-type content, when the content distribution section 44 distributes the content to the user terminal 10, the license information providing section 45 generates the license file L and provides the generated license file L to the user terminal 10. On the other hand, in a case where the target content is a rental-type content, when the content distribution section 44 distributes the content, instead of generating the license file L, the license information providing section 45 provides information necessary for the user terminal 10 to generate the dummy license file D. Specifically, the license information providing section 45 provides information on the permission period PH and the temporary expiration date TXD to the user terminal 10. Note that, in a case where the restriction of the temporary expiration date TXD is not set for the content, it is not necessary to transmit the information on the temporary expiration date TXD to the user terminal 10.

Further, in the case where the information on the permission period PH and (if necessary) the temporary expiration date TXD for the rental-type content is transmitted to the user terminal 10, the license information providing section 45 stores the information in association with the user to whom the information is provided and information for identifying the target content in the storage unit 22. Thereafter, when the user attempts to watch or listen to the content, in response to a request to acquire a license, which is transmitted from the user terminal 10, the license information providing section 45 generates the license file L based on the information stored in the storage unit 22. Specifically, when the request to acquire the license for the rental-type content is received from the user, the license information providing section 45 first judges whether or not the information on the permission period PH and the temporary expiration date TXD associated with the content and the user is stored in the storage unit 22. If such information does not exist, which means that the user does not have the right to watch or listen to the content, the license information providing section 45 transmits a response to the effect that the license file L cannot be provided, to the user terminal 10.

If, on the other hand, the information on the permission period PH and the temporary expiration date TXD is stored in the storage unit 22, the license information providing section 45 generates the license file L containing information on the expiration date XD, which is set based on the timing when the request to acquire the license is received and on the information on the permission period PH and the temporary expiration date TXD. Then, the license information providing section 45 transmits the generated license file L to the user terminal 10 that has made the request to acquire the license. When the license file L is received, the user terminal 10 stores the license file L in the storage unit 12, and executes reproduction processing for the content based on the usage right indicated by the stored license file L.

Specifically, when the request to acquire the license is received, the license information providing section 45 acquires information on the current date and time counted by the timer unit 24, and generates the license file L containing the information on the expiration date XD, which is set based on the timing when the permission period PH has passed from the current date and time. Specifically, the license information providing section 45 first calculates the date and time obtained by adding the permission period PH to the current date and time. Then, the earlier one of the calculated date and time and the temporary expiration date TXD stored in the storage unit 22 is determined as the expiration date XD. Further, the license information providing section 45 generates the license file L for granting the usage right of the requested content until the expiration date XD arrives to the user who has made the request to acquire the license, and transmits the generated license file L to the user terminal 10. As described above, in the case of the rental-type content, the request to acquire the license is made from the user terminal 10 at a time point when the user terminal 10 attempts to start reproducing the content. Therefore, by thus determining the expiration date XD in consideration of the timing when the request to acquire the license is received, if there is enough time before the temporary expiration date TXD, the user can watch or listen to the content from the start of the reproduction of the content until the permission period PH has passed.

Note that, when the license information providing section 45 once generates the license file L and provides the generated license file L to the user terminal 10, the license information providing section 45 stores the license file L in the storage unit 22. If the request to acquire the license from the same user for the same content, instead of newly generating the license file L, the license information providing section 45 provides the license file L stored in the storage unit 22. In this case, the expiration date XD that has been determined once for the same content is not changed, and it is possible to prevent the expiration date XD from extending every time the user stops and restarts watching or listening to the content.

Next, specific examples of a flow of processing executed by the content protection system 1 according to this embodiment are described.

Figure 4:
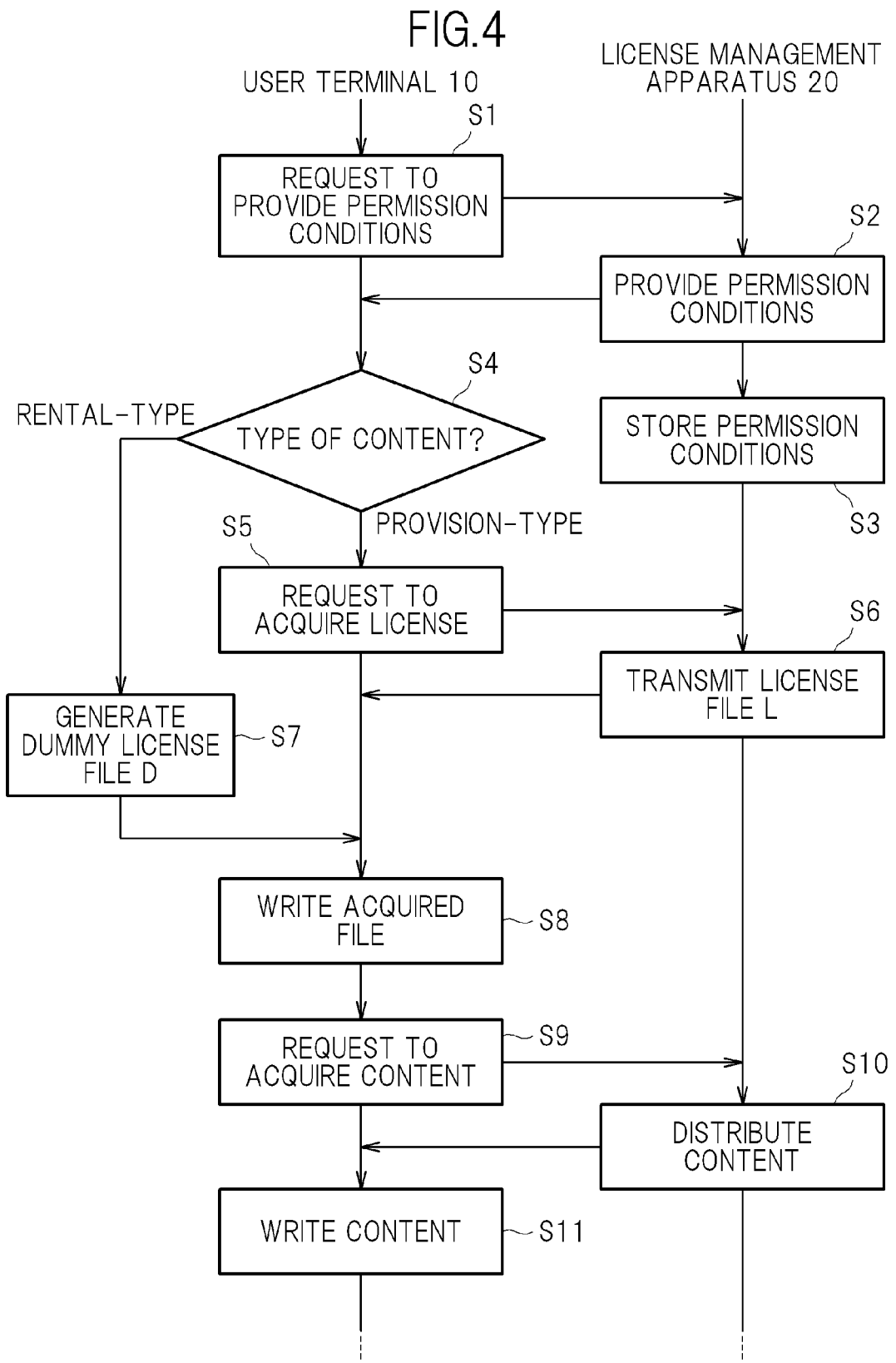
FIG. 4 is a flow chart illustrating an example of a flow of processing executed by the content protection system according to the embodiment of the present invention at the time of distributing a content.

First, referring to a flowchart of FIG. 4, a specific example of a flow of processing at the time of distributing a content is described. This processing is executed when, for example, the user terminal 10 acquires a list of contents distributed by the license management apparatus 20 for presenting to the user, and the user selects a content to be acquired from the list.

First, for the content selected by the user to be acquired, the user terminal 10 requests the license management apparatus 20 to provide information on permission conditions for the content (S1). The request contains user identification information (for example, user ID) for identifying the requesting user, and content identification information (for example, content ID) for identifying the requested content. In response to the request, the license information providing section 45 of the license management apparatus 20 transmits the information on the permission conditions that are preset in association with the content to the user terminal 10 (S2). The information to be transmitted includes, for example, information on the expiration date XD in the case of the provision-type content, or information on the temporary expiration date TXD and the permission period PH in the case of the rental-type content. The information to be transmitted may also include information indicating whether the content is a provision-type content or a rental-type content.

Further, the license information providing section 45 stores an indication to the effect that the information on the permission conditions is transmitted to the user terminal 10 in the storage unit 22. Specifically, the license information providing section 45 stores the information on the permission conditions transmitted in S2 in association with the user identification information and the content identification information contained in the request in S1 (S3). FIG. 5 is a diagram illustrating an example of the information stored in the storage unit 22 of the license management apparatus 20 in this processing. FIG. 5 illustrates an example of a case of permitting use of a rental-type content C1 by a user U1, and the user U1 is permitted to watch or listen to the content C1 until 3 hours have passed from the start of watching or listening to the content C1. Further, the current date and time at the timing of transmitting the information in S2 is stored as a start timing of an effective period, and the temporary expiration date TXD is stored as an end timing.

Next, the license acquisition section 43 of the user terminal 10 executes the following processing in response to an instruction to acquire the content from the user. First, the license acquisition section 43 uses the information acquired in S2 to judge the type (provision-type or rental-type) of the content that the user has provided an instruction to acquire (S4). Note that, even if the information acquired in S2 does not contain the information directly indicating whether the content is the provision-type content or the rental-type content, the type of the content may be judged based on the presence or absence of the information on the permission period PH.

If it is judged in S4 that the content is the provision-type content, the license acquisition section 43 transmits a request to acquire a license to the license management apparatus 20 (S5). In response to the request, the license information providing section 45 of the license management apparatus 20 generates a license file L of the target content and transmits the generated license file L to the user terminal 10 (S6). The license file L contains the information on the expiration date XD transmitted to the user terminal 10 in S2.

If it is judged in S4 that the content is the rental-type content, on the other hand, the license acquisition section 43 generates a dummy license file D containing the information on the temporary expiration date TXD and the permission period PH acquired in S2 (S7).

In either case of receiving the license file L transmitted in S6 or generating the dummy license file D in S7, the license acquisition section 43 writes the acquired file in the storage unit 12 (S8). Then, the content acquisition section 41 of the user terminal 10 transmits a request to acquire the content to the license management apparatus 20 (S9). In response to the request, the content distribution section 44 of the license management apparatus 20 distributes the requested content (S10). The requested content is written in the storage unit 12 of the user terminal 10 (S11).

Through the processing described above, the user terminal 10 acquires the content selected by the user and the license file L or the dummy license file D corresponding to the content. Note that, the license file L is information indicating that the user terminal 10 has the usage right required for reproducing the content, and the license file L itself needs to be protected from tampering by an unauthorized user. Therefore, the license management apparatus 20 adds an electronic signature to the license file L at the time of generating the license file L. This way, the license file L is prevented from being altered on the user terminal 10 side. Further, the license file L acquired by the user terminal 10 may be protected by methods such as being stored in a region in the storage unit 12 to which access from the user is restricted. The dummy license file D, on the other hand, does not necessarily need such protection.

In addition, the license file L and the dummy license file D may at least partially have a common data format. Further, those files may be stored in the storage unit 12 under the same file name. Especially by storing the information on the expiration date XD in the license file L and the information on the temporary expiration date TXD in the dummy license file D with similar formats, when the user provides an instruction to display the conditions for using the content, for example, the license acquisition section 43 may read the information on the expiration date XD or the temporary expiration date TXD from either file for presenting to the user as information indicating the end timing of watching or listening to the content, without discriminating which of the license file L and the dummy license file D is stored in association with the content. Specifically, when the user provides an instruction to display information on the usage right of the content, the license acquisition section 43 displays the temporary expiration date TXD contained in the dummy license file D under a state in which the license file L has not been acquired (state in which the dummy license file D is present), and displays the expiration date XD contained in the license file L after the license file L is acquired. In this case, if the license file L and the dummy license file D can be accessed under the same file name and the storage location of the expiration date XD in the license file L and the storage location of the temporary expiration date TXD in the dummy license file D are identical, the license acquisition section 43 can display such information in a similar manner irrespective of which of the license file L and the dummy license file D is currently stored in association with the content. Note that, under the state in which the dummy license file D is stored, the user terminal 10 may present the information on the permission period PH in addition to the temporary expiration date TXD as requested by the user.

Next, referring to a flow chart of FIG. 6, a specific example of a flow of processing at the time when the user terminal 10 reproduces a content is described.

First, when an operation for providing an instruction to reproduce the content is received from the user, the content reproduction control section 42 of the user terminal 10 judges whether or not a license file L corresponding to the content specified for reproduction is present (S21). If it is judged that the license file L is not present, the content reproduction control section 42 further judges whether or not the dummy license file D is present (S22).

Note that, the judgments in S21 and S22 may be performed at once. For example, if the license file L and the dummy license file D are stored under the same file name as described above, the content reproduction control section 42 may access the license file with the file name corresponding to the content specified for reproduction and judges the type of the file, to thereby check to see which one of the legitimate license file L or the dummy license file D is present in the storage unit 12, or to see that neither type is present. In this case, each of the license file L and the dummy license file D contains type information indicating the type of the file (legitimate license file L or dummy license file D). This allows the content reproduction control section 42 to judge, when the license file of either type corresponding to the content specified for reproduction is present, whether the file is the legitimate license file L or the dummy license file D by referring to the type information contained in the file. Alternatively, the user terminal 10 may separately hold type information indicating the type of the license file the user terminal 10 holds. In this case, at the time of performing, for example, the processing of S8 in the flow of FIG. 4 described above, the license acquisition section 43 also records the type information indicating the type (legitimate license file L or dummy license file D) of the file stored in the storage unit 12. This allows the content reproduction control section 42 to judge, when an instruction to reproduce the content is provided, whether the file stored in the storage unit 12 in S8 is the license file L or the dummy license file D by referring to the type information corresponding to the content. Alternatively, the user terminal 10 may discriminate between the license file L and the dummy license file D based on the difference in data structure, recorded data items, and the like of the license file itself corresponding to the content specified for reproduction.

When neither the license file L nor the dummy license file D is present, the user terminal 10 has no usage right of the content. Therefore, the content reproduction control section 42 displays a message to the effect that the content cannot be reproduced, for example, to end the processing (abnormal termination). If, on the other hand, the dummy license file D is present, the user terminal 10 does not currently have the license file L but can acquire the license file L from the license management apparatus 20. Accordingly, the license acquisition section 43 transmits a request to acquire a license to the license management apparatus 20 in accordance with an instruction from the content reproduction control section 42 (S23). The request to acquire the license contains the content identification information for identifying the content to be reproduced and the user identification information for identifying the user who has provided the instruction for reproduction.

When the request to acquire the license is received, the license information providing section 45 of the license management apparatus 20 judges whether the license file L has already been issued for the user and the content associated with the request (S24). If the license file L for granting the usage right of the requested content has not been issued to the user who has provided the request to acquire the license, the license information providing section 45 newly generates the license file L and stores the generated license file L in the storage unit 22 (S25). At this time, the license information providing section 45 determines the expiration date XD by using the information on the temporary expiration date TXD and the permission period PH stored in the storage unit 22 in the above-mentioned processing in S3 of FIG. 4 and the information on the current date and time, and generates the license file L containing information on the determined expiration date XD.

If it is judged in S24 that the license file L has already been issued, on the other hand, the issued license file L is stored in the storage unit 22 in S25 described above when the processing of FIG. 6 was previously performed. Therefore, in both the case where it is judged in S24 that the license file L has already been issued and the case where the license file L is newly generated in S25, the license information providing section 45 transmits the license file L to the user terminal 10 (S26).

When the license file L transmitted in S26 is received, the license acquisition section 43 of the user terminal 10 writes the license file L in the storage unit 12 (S27). At the same time, the license acquisition section 43 deletes the dummy license file D associated with the content to be reproduced. This is because the dummy license file D becomes unnecessary when the legitimate license file L is acquired. Further, if the information on the type of the license file held by the user terminal 10 is stored in the storage unit 12 as described above, the license acquisition section 43 alters the information on the type from information indicating the dummy license file D to information indicating the legitimate license file L at the time of performing the processing in S27.

In both the case where it is judged in S21 that the license file L is present and the case where the license file L is written in the storage unit 12 in S27, the content reproduction control section 42 uses the license file L to judge whether or not reproduction of the content requested by the user is permitted (S28), and if it is judged that the user has the usage right of the content, the reproduction of the content is started (S29). Note that, if it is judged that the reproduction of the content is not permitted as a result of the judgment using the license file L in S28, the content reproduction control section 42 displays the message to the effect that the content cannot be reproduced, for example, to end the processing (abnormal termination).

Note that, in the processing example described above, the user terminal 10 stores the license file L acquired from the license management apparatus 20 in the storage unit 12, and when the same user provides an instruction to reproduce the same content for the second and subsequent time, the license file L in the storage unit 12 is used to judge whether or not the reproduction is permitted. However, the user terminal 10 may acquire the license file L from the license management apparatus 20 every time the instruction to reproduce the content is received from the user, and use the acquired license file L to judge whether or not the reproduction of the content is permitted. In this case, the user terminal 10 does not need to hold the license file L in the storage unit 12 for a long period of time, and hence it is possible to reduce the risk of tampering of the license file L by an unauthorized user, for example.

Further, in the above description, it is assumed that the user terminal 10 is used by one user and one user uses one user terminal 10. However, one user may use a plurality of user terminals 10. In this case, in this embodiment, the usage right of the content is granted for each user. Therefore, in the case where the same user uses the plurality of user terminals 10, the plurality of user terminals 10 need to share the same license file L. In order to make such control possible, in the processing example described above, the license management apparatus 20 holds the license file L in the storage unit 22 even after the license file L is once provided to a user terminal 10. Therefore, even if the request to acquire the license is received from a user terminal 10 other than the user terminal 10 to which the license file L is provided, when the request is from the same user, the license management apparatus 20 provides the license file L stored in the storage unit 22. Accordingly, the same license file L is provided to the plurality of user terminals 10. Note that, as an alternative to the above description, the license management apparatus 20 may independently grant the usage right of the content to each of the plurality user terminals 10.

Further, if a plurality of users use one user terminal 10, the user may need to acquire the license file L from the license management apparatus 20 independently of each other. In this case, each user is authorized by inputting a password or other such methods when the user uses the user terminal 10. Then, the user terminal 10 transmits the request to acquire the license to the license management apparatus 20 so as to grant the authorized user the usage right. This allows the license management apparatus 20 to independently grant each user the usage right even if the plurality of users share the one user terminal 10.

Alternatively, if a plurality of users share one user terminal 10, the users may also share a license file L. In this case, for example, when the user terminal 10 acquires a license file L for reproducing a content for one user, the other users can also watch or listen to the content as permitted by the license file L. Note that, in this embodiment, as described above, in the case of the rental-type content, the permission period PH starts at the timing when the user first provides an instruction to reproduce the content. Therefore, if a user acquires the usage right of the rental-type content by paying the fee, for example, it is not preferred to start the permission period PH when another user starts watching or listening to the content. Accordingly, in the case of the rental-type content, when the reproduction of the content is started for the first time (in other words, when the reproduction of the content is started while the license file L has not been acquired and the dummy license file D is stored in the storage unit 12), the user terminal 10 may judge whether or not the user who has provided the instruction to reproduce the content and the user who has provided the instruction to acquire the dummy license file D match, and transmits the request to acquire the license to the license management apparatus 20 only if the users match.

Note that, in the above description, it is judged whether or not the user has the usage right of the content using the license file L only when the reproduction of the content is started. However, when the information on the expiration date XD is contained in the license file L, the user terminal 10 may monitor whether or not the expiration date XD has arrived also during the reproduction of the content. As a result, when the expiration date XD arrives during the reproduction of the content, the user terminal 10 ends the reproduction of the content. Note that, in this case, the user terminal 10 may output a warning message to notify the user of the approaching expiration date XD at a predetermined timing before the expiration date XD arrives. Especially in a case of a game content, it is not desirable if the expiration date XD arrives while a game is executed and the game suddenly ends. Therefore, when such warning message is output, the user may take some action, for example, save the execution state of the game, before the expiration date XD arrives. Note that, the output timing of the warning message may be a predetermined timing before the expiration date XD, for example, 5 minutes before the expiration date XD. Alternatively, the output timing may be a predetermined content-specific timing before the expiration date XD. In this case, information defining the warning timing for each content may be provided in data of the content to the user terminal 10 or included in the license file L when the license management apparatus 20 generates the license file L.

Note that, the present invention is not limited to the embodiment described above. For example, in the above description, the license management apparatus 20 distributes not only the license file L but also the content to the user terminal 10, but the distribution of the content maybe performed by a content distribution apparatus that is different from the license management apparatus 20. Further, in the above description, the user terminal 10 generates the dummy license file D using the information on the temporary expiration date TXD and the permission period PH provided from the license management apparatus 20. However, the present invention is not limited thereto, and for example, the license management apparatus 20 may generate the dummy license file D and transmit the generated dummy license file D to the user terminal 10. In addition, a variety of permission conditions may be set to the content in combination with the restrictions of the expiration date XD and the permission period PH described above.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A content protection system, comprising:
a user terminal; and
a license management apparatus,
the user terminal comprising:
   a judging unit for judging, when a content is to be reproduced or executed, whether or not the user terminal has a usage right of the content;
   a usage right requesting unit for making, if the judging unit judges that the user terminal does not have the usage right of the content, a request to the license management apparatus to acquire the usage right of the content;
   a generating unit for generating, when the content is to be acquired, temporary license information on the content; and
   a control unit for preventing usage of the content using the generated temporary license information,
   wherein the usage right requesting unit makes, when the temporary license information is present, the request to the license management apparatus to acquire the usage right of the content,
the license management apparatus comprising:
   a license information generating unit for generating, when the request to acquire the usage right is received from the user terminal, license information containing information on an expiration date that is set based on a timing when the request is received; and
   a license information transmitting unit for transmitting the generated license information to the user terminal,
   wherein the judging unit judges that the user terminal has the usage right of the content until the expiration date indicated by the license information received from the license management apparatus arrives.

2. The content protection system according to claim 1, wherein the license information generating unit generates the license information containing information on the expiration date that is set based on a timing when a predetermined permission period has passed from the timing when the request is received.

3. The content protection system according to claim 1, wherein:
   the temporary license information contains information on a temporary expiration date; and
   the user terminal further comprises a displaying unit for displaying, as information on the usage right of the content, the temporary expiration date before acquiring the license information, and the expiration date indicated by the license information after acquiring the license information.

4. The content protection system according to claim 1, wherein:
   the usage right requesting unit transmits, when making the request to the license management apparatus to acquire the usage right of the content, user identification information for identifying a user who has provided an instruction to reproduce or execute the content to the license management apparatus;
   the license information generating unit judges whether or not the license information for granting the usage right of the content to the user identified by the user identification information has been generated, and when the license information has not been generated, newly generates the license information to the user; and
   the license information transmitting unit transmits, when it is judged that the license information has been generated for the user identified by the user identification information, the generated license information to the user terminal.

5. The content protection system according to claim 1, wherein the usage right requesting unit judges whether or not a user who has provided an instruction to reproduce or execute the content and a user who has provided an instruction to acquire the temporary license information match, and makes the request to acquire the usage right of the content only if the users match.

6. A user terminal to be connected to a license management apparatus, comprising:
   a judging unit for judging, when a content is to be reproduced or executed, whether or not the user terminal has a usage right of the content;
   a usage right requesting unit for making, if the judging unit judges that the user terminal does not have the usage right of the content, a request to the license management apparatus to acquire the usage right of the content;
   a generating unit for generating, when the content is to be acquired, temporary license information on the content; and
   a control unit for preventing usage of the content using the generated temporary license information,
   wherein the usage right requesting unit makes, when the temporary license information is present, the request to the license management apparatus to acquire the usage right of the content, and
   wherein the judging unit judges that the user terminal has the usage right of the content until an expiration date indicated by license information received from the license management apparatus in response to the request to acquire the usage right arrives, the expiration date being set based on a timing when the license management apparatus receives the request to acquire the usage right.

7. A content protection method using a user terminal connected to a license management apparatus, comprising:
   judging, by the user terminal, when a content is to be reproduced or executed, whether or not the user terminal has a usage right of the content;
   requesting, by the user terminal, if it is that the user terminal does not have the usage right of the content, the license management apparatus to acquire the usage right of the content;
   generating, when the content is to be acquired, temporary license information on the content; and
   preventing usage of the content using the generated temporary license information,
   wherein the request to the license management apparatus to acquire the usage right of the content is made when the temporary license information is present, and
   wherein, if license information is received from the license management apparatus in response to the request to acquire the usage right, it is judged that the user terminal has the usage right of the content until an expiration date indicated by the license information arrives, the expiration date being set based on a timing when the license management apparatus receives the request to acquire the usage right.

8. A non-transitory computer-readable information storage medium having a program stored therein, the program causing a computer connected to a license management apparatus to function as:
   a judging unit for judging, when a content is to be reproduced or executed, whether or not the computer has a usage right of the content;

a usage right requesting unit for making, if the judging unit judges that the computer does not have the usage right of the content, a request to the license management apparatus to acquire the usage right of the content; and a generating unit for generating, when the content is to be acquired, temporary license information on the content, a control unit for preventing usage of the content using the generated temporary license information;

wherein the usage right requesting unit makes, when the temporary license information is present, the request to the license management apparatus to acquire the usage right of the content, and wherein the judging unit judges that the computer has the usage right of the content until an expiration date indicated by license information received from the license management apparatus in response to the request to acquire the usage right arrives, the expiration date being set based on a timing when the license management apparatus receives the request to acquire the usage right.

* * * * *